(12) United States Patent
Evans

(10) Patent No.: US 6,865,008 B2
(45) Date of Patent: Mar. 8, 2005

(54) TRIMMER IRIS FOR USE WITH A DIGITALLY SHAPE-CONTROLLED LIGHTING SYSTEM

(75) Inventor: Nigel Evans, West Midlands (GB)

(73) Assignee: Light and Sound Design Ltd.

( * ) Notice: Subject to any disclaimer, the term of this patent is extended or adjusted under 35 U.S.C. 154(b) by 0 days.

(21) Appl. No.: 10/409,867

(22) Filed: Apr. 8, 2003

(65) Prior Publication Data

US 2003/0206328 A1 Nov. 6, 2003

Related U.S. Application Data

(63) Continuation of application No. 09/779,196, filed on Feb. 7, 2001, now Pat. No. 6,549,324.
(60) Provisional application No. 60/181,483, filed on Feb. 10, 2000.

(51) Int. Cl.[7] ............................................. G02B 26/00
(52) U.S. Cl. ...................................... 359/291; 359/292
(58) Field of Search ................................ 362/293, 294, 362/297, 318, 321, 342, 346; 359/291, 292; 352/25, 169, 216; 345/418, 419; 250/492.22; 382/162, 167, 181; 353/108–110, 530, 719, 747; 348/26

(56) References Cited

U.S. PATENT DOCUMENTS

| 4,143,951 | A | | 3/1979 | Suzaki et al. |
| 4,365,875 | A | | 12/1982 | Hirata et al. |
| 4,889,424 | A | | 12/1989 | Saiki |
| 5,379,083 | A | | 1/1995 | Tomita |
| 5,597,223 | A | | 1/1997 | Watanabe et al. |
| 5,769,527 | A | * | 6/1998 | Taylor et al. .................. 362/85 |
| 5,909,204 | A | | 6/1999 | Gale et al. |
| 6,220,730 | B1 | | 4/2001 | Hewlett et al. |
| 6,256,136 | B1 | * | 7/2001 | Hunt ........................... 359/291 |
| 6,433,348 | B1 | | 8/2002 | Abboud et al. |

* cited by examiner

Primary Examiner—Hung Xuan Dang
Assistant Examiner—Tuyen Tra
(74) Attorney, Agent, or Firm—Fish & Richardson P.C.

(57) ABSTRACT

An electronic projection device stores a library of images used for gobos, or light shaping devices, to shape the light. Those gobos each have a specified size. A device adjusts the amount of ligth which passes based on the size information about a gobo. The size of the image is automatically determined, and maximize is used to adjust the amount of opening of a mechanical device, such as a motor driven iris. In this way, the motor driven iris can automatically open to a size that is based on the image information.

25 Claims, 4 Drawing Sheets

TRIMMER IRIS FOR USE WITH A DIGITALLY SHAPE-CONTROLLED LIGHTING SYSTEM

CROSS-REFERENCE TO RELATED APPLICATIONS

The present application is a continuation of U.S. application Ser. No. 09/779,196, filed Feb. 7, 2001, now U.S. Pat. No. 6,549,324 which claims benefit of U.S. provisional application Ser. No. 60/181,483, filed Feb. 10, 2000.

BACKGROUND

U.S. Patent Applications and co-pending patents by Light and Sound Design describe a stage lighting system which is run by stage lighting luminaries. Each of the luminaries includes a digitally controlled light shape altering device. The specific light shape altering device is the Texas Instruments digital micromirror device or "DMD". This device is digitally controlled to produce shape altering outputs as well as effects on the light.

SUMMARY

The present invention teaches a special trimmer iris, structure of the iris and aspects of use of such a trimmer iris, which produces advantages in a digitally controlled, pixel level device such as a DMD.

BRIEF DESCRIPTION OF THE DRAWINGS

These and other aspects will now be described in accordance with the drawings, in which.

DETAILED DESCRIPTION

Figure 1:
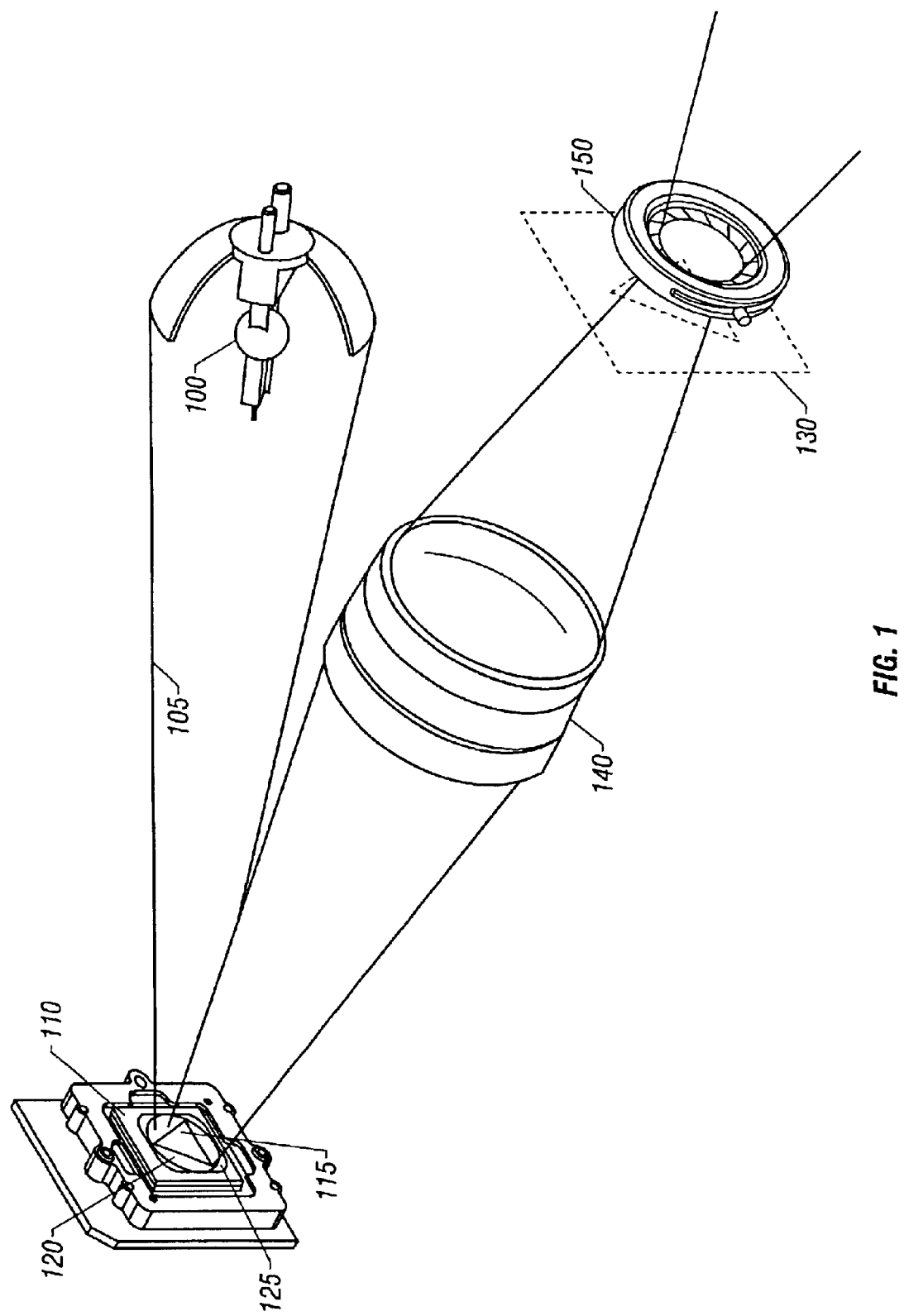
FIG. 1 shows an exploded view of the system.

A basic layout of the system is shown in FIG. 1. A lamp 100 produces a light output beam 105 which impinges on a pixel level controllable device such as a digital mirror device 110. The digital mirror 110 has an active part 115 which represents the image that forms the "gobo" or light passing shape. The image can be simple, e.g., a triangle as shown, or more complex. The image can be "white", wherein it will pass all light (other than quantum inefficiencies), or it can be colored.

Area 120 represents the part around the image, but still within the DMD. This is intended to be "black", i.e., not to reflect any light at all. Due to stray reflection, however, it is viewed as some shade of gray. 125 represents the outer part of the shape; again which is intended to be black, but is not perfect black.

Since the image is formed by digital mirror parts, the edges of the mirrors may refract light and in any case form an imperfect black level.

Our co-pending application describes using a gate to block off light outside the digital mirror.

The present application addresses this issue by using a special trimmer iris 150 in the path of the light beam. The iris has a variable size central element which changes in size to basically track the size of the image on the DMD. The tracking can be automatic. The size of the trimmer iris can be a selected parameter that is set by the lighting designer.

Figure 2:
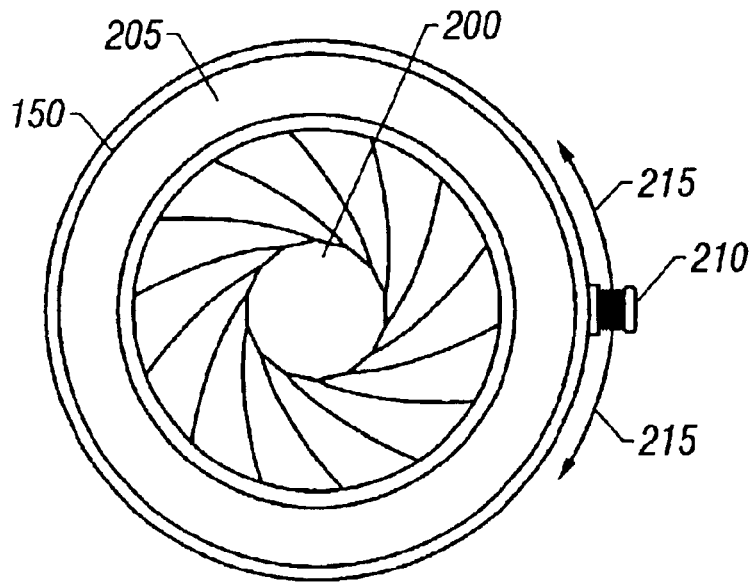
FIG. 2 shows a view of the iris.

FIG. 2 shows an iris that can be used according to the present system. The iris has a variable size central aperture 200, which is open, and a surrounding closed part 205. The size of the central open aperture 200 can be adjusted by moving the driven piece 210 in the directions shown by arrows 215.

Figure 3:
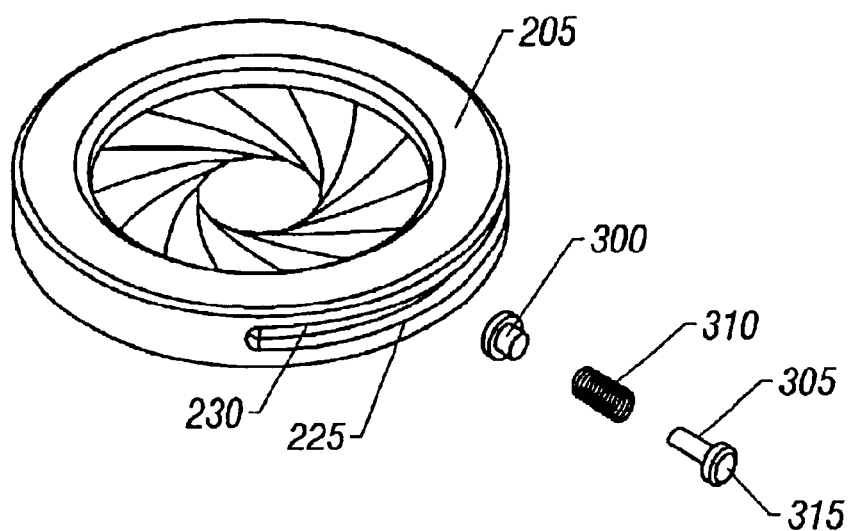
FIG. 3 shows the outer surface of the iris, and an exploded view of the screw device that is pressed against the outer surface.

Further detail on the driven piece is shown in FIG. 3, which shows a spring portion 310 thereon. This spring may be used to hold the driven part more steady. The driven part 210 includes a nylon shoulder 300 pressed against the bearing surface 225 of the iris. The nylon shoulder rests around a screw part 305 which is screwed into a nut held within the bearing surface. Spring part 310 rests on top of the nylon shoulder and is pressed by a screw head 315. The screw head 315 holds the spring 310 between the bottom portion of the screw head 315 and the top portion of the nylon shoulder. In this way, the nylon shoulder is pressed against the bearing surface 225 thereby holding the nylon shoulder 300 down against the bearing surface 225. This keeps pressure against that surface and hence allows the iris to operate more steadily.

Figure 4A:
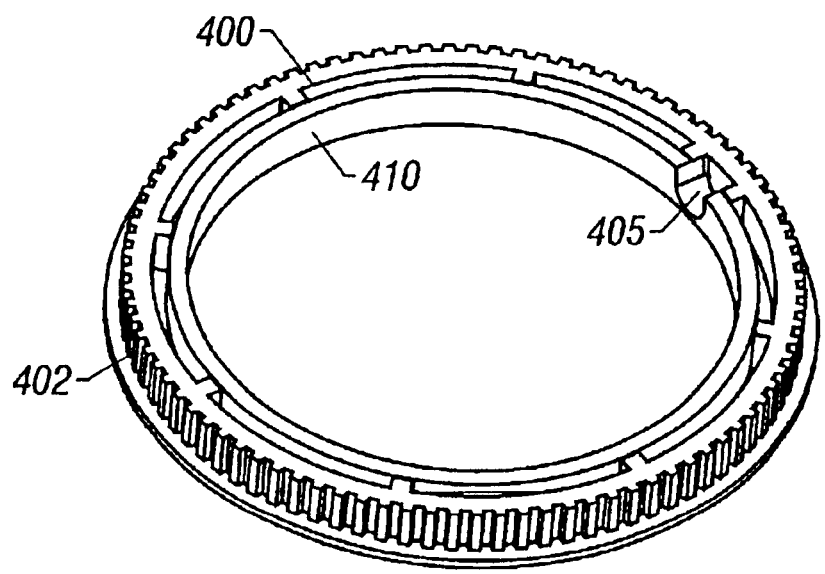
FIGS. 4A and 4B show the bearing surface.
Figure 4B:
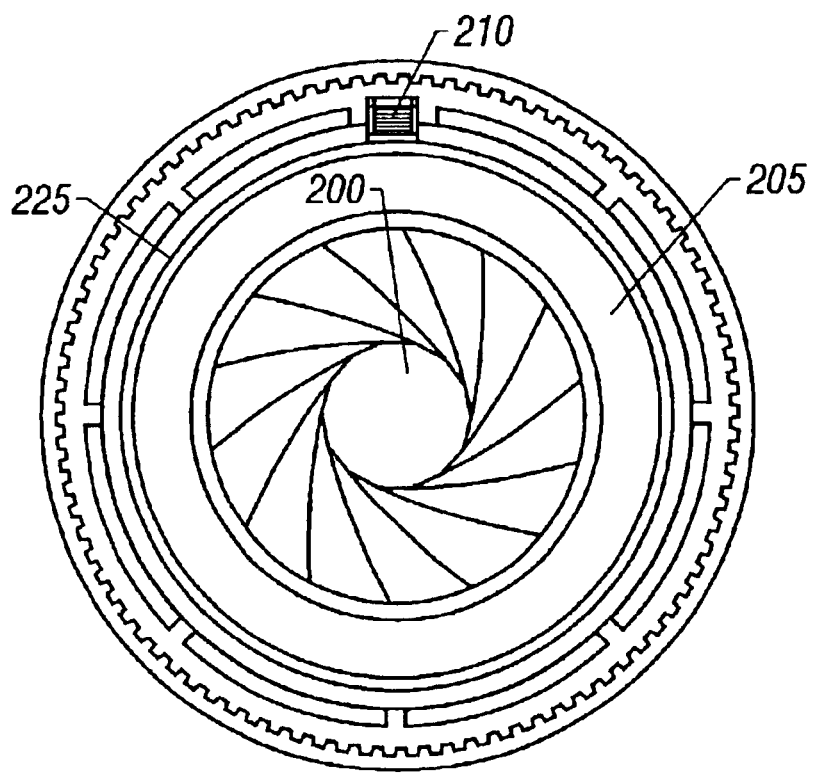

An outer pulley assembly is assembled around the iris. The pulley assembly is shown in FIGS. 4A and 4B. The pulley assembly has an outer pulley part 400. Outer surface 402 of the part 400 is notched to accept a corresponding notched belt. Part 400 also includes an inner part 405 that is a cut out in the inner surface of part 400, to accept the driven element 220. The pulley holds the driven element 220 captive within it, and the iris outer surface 225 presses against the inner surface 410 of the pulley assembly. As the pulley assembly rotates, it correspondingly rotates the iris element.

Figure 5:
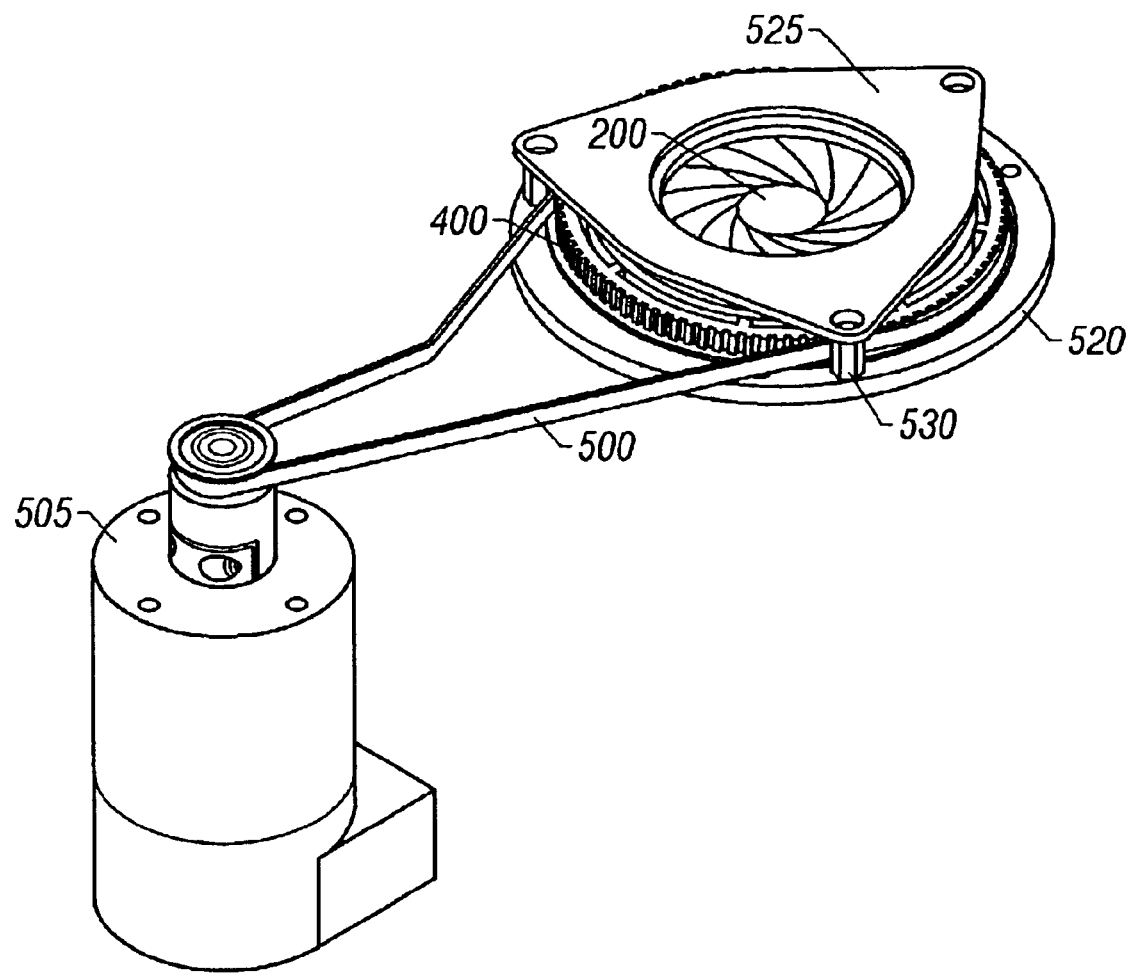
FIG. 5 shows the mounting assembly and the motor.

In operation, the device is held on a location plate as shown in FIG. 5. The location plate holds the pulley assembly and its internal iris in a specified location. A belt 500 is driven by a motor 505. The iris is driven to one end in order to reset and initialize. It can also be driven to the other end, in order to determine the end position also.

The image 115 on the digital mirror device 110 is produced by a processor, shown in FIG. 1 as digital signal processor ("DSP") 160. DSP operates according to images which are stored in memory such as 165. These images have a specified outer size. The image 115 for instance shown in FIG. 1 has an overall outer size defined by the three corners of the triangle. The digital signal processor 160 also runs a program to determine the size of the outer extent of the image. That program is used to produce a specified size for the iris assembly 150. Signal 170 drives the iris assembly to the smallest possible size that it can have in order that still allows the image to pass.

In this embodiment, the size of the mask automatically tracks the image on the DMD.

Other alternatives can also be used. The size of the image can be stored as part of a library of gobos, in the memory 165 associated with each gobo. This stored size can be used to set the iris.

Alternately, the size of the iris can be manually adjusted by the lighting designer as part of the show parameters.

Other embodiments are within the disclosed embodiment.

What is claimed is:

1. An apparatus comprising:
 a memory, storing a library of images which are used for gobos to shape projected light, and also storing size information indicative of a size of said image; and a processor, controlling projecting light in specified shapes based on shapes that are stored in said library; and a mechanical device which adjusts an amount of light which passes, based on said size information.

2. An apparatus as in claim 1, wherein said mechanical device is a motor driven iris, and said motor is driven to open the iris to a size that is based on said size information.

3. An apparatus as in claim 2, wherein said Iris has a driven piece whose position determines an open diameter of said Iris, and wherein said driven piece includes a bearing surface, and an extending part extending from said bearing surface, and a spring element, pressing between said extending piece and said bearing surface.

4. An apparatus as in claim 1, further comprising a light shape altering device, controlled based on a selected one of said images, to shape the projected light.

5. An apparatus as in claim 4, wherein said light shape altering device is a digital mirror device.

6. An apparatus as in claim 4, further comprising a light projection element, projecting light to said light shape altering device, and wherein said mechanical device is located optically between said light shape altering device, and a light output port.

7. An apparatus, comprising:

a user interface, selecting an image from a library of images, which are used to control a light beam to be displayed in a size and/or shape based on information in said library of images; and a processor, responsive to said user interface, operating to select the image, to produce an output signal based on the image, and to produce another output signal which indicates a size of the selected image.

8. An apparatus as in claim 7, further comprising a mechanical device, responsive to said another output signal, and controlling a size of a light gate which is produced based on said another output signal.

9. An apparatus as in claim 8, wherein said mechanical device includes an Iris, a motor, a pulley assembly, connected between said Iris and said motor, and wherein said motor is controlled by said processor.

10. An apparatus as in claim 7, further comprising a digital mirror device, coupled to receive said output signal from said processor.

11. An apparatus as in claim 7, wherein said processor automatically determines a size of said image, and produces said another output signal based on the size.

12. An apparatus as in claim 7, wherein said processor detects a user entered signal indicative of the size of said image, and produces said another output signal based on said user entered signal.

13. An apparatus as in claim 7, wherein said library of images stores information indicative of a size of said image, and wherein said processor produces said another output signal based on said information.

14. An apparatus as in claim 7, wherein said processor is a digital signal processor.

15. A method, comprising:

obtaining an image for use in shaping a light beam;

automatically determining a size of said image;

using said image to shape said light beam, and using said size to select a size of an output gate which passes said light beam.

16. A method, comprising:

obtaining an image for use in shaping a light beam;

obtaining a size required to pass said image;

using said image to shape said light beam, and using said size to select a size of an output gate which passes said light beam; and wherein said obtaining a size comprises manually entering a size of said image.

17. A method, comprising:

obtaining an image for use in shaping a light beam;

obtaining a size required to pass said image;

using said image to shape said light beam, and using said size to select a size of an output gate which passes said light beam; and wherein said using said size to select a size of an output gate comprises controlling a controllable iris to a size which is expected to pass said image, but to block portions of the light beam outside said image.

18. A method as in claim 17, wherein said controlling a controllable iris comprises driving a motor that is connected via pulley to said Iris.

19. A method, comprising:

obtaining an image for use in shaping a light beam;

obtaining a size required to pass said image;

using said image to shape said light beam, and using said size to select a size of an output gate which passes said light beam; and initializing said output gate by determining fully closed and fully open positions of said output gate.

20. A method as in claim 19, wherein said initializing comprises driving said output gate to a fully closed position, storing information indicative of said fully closed position, and driving said output gate to a fully open position, and storing information indicative of said fully open position.

21. A method, comprising:

selecting a computer file indicative of an image to be used to shape a light beam to be projected;

determining a size of said image; and reducing projected light which is outside of said size of said image.

22. A method as in claim 21 wherein said reducing comprises gating an output light beam according to said size of said image.

23. A method as in claim 21, wherein said determining a size comprises automatically determining a size of said image.

24. A method as in claim 21, wherein said determining a size comprises manually entering a size of said image.

25. A method as in claim 21, further comprising storing a size record associated with said computer file, and using said size record to determine said size of said image.

* * * * *